P. ODEIN.
EXPLOSIVE ENGINE STARTER.
APPLICATION FILED NOV. 5, 1917.
1,263,596.
Patented Apr. 23, 1918.
3 SHEETS—SHEET 2.
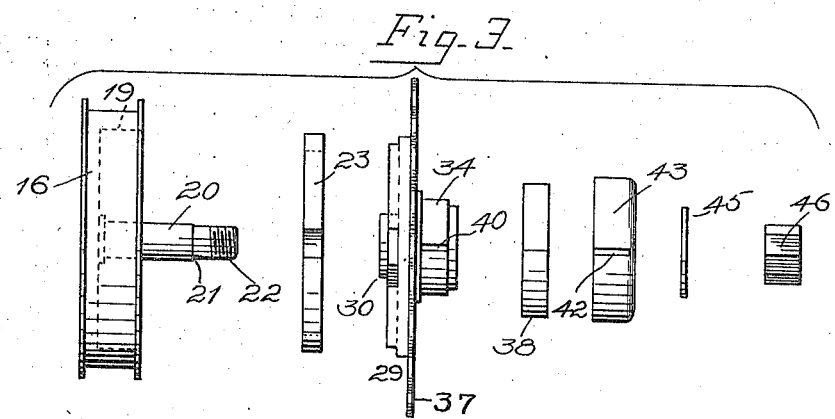
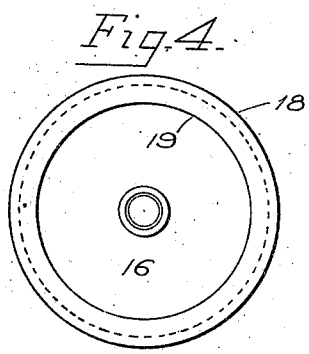
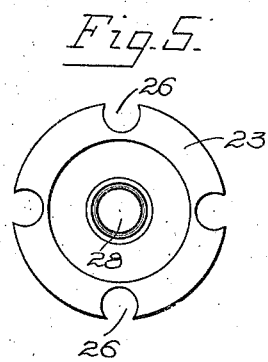
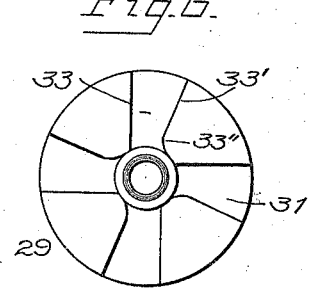
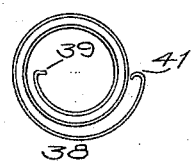
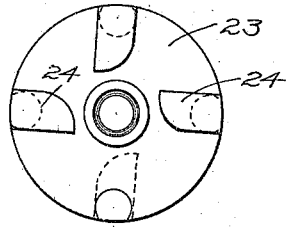
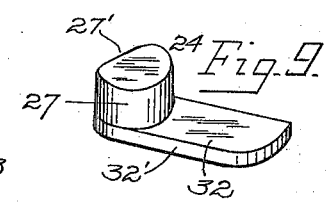
Peter Odein Inventor
By
Henry E. Rockwell Attorney

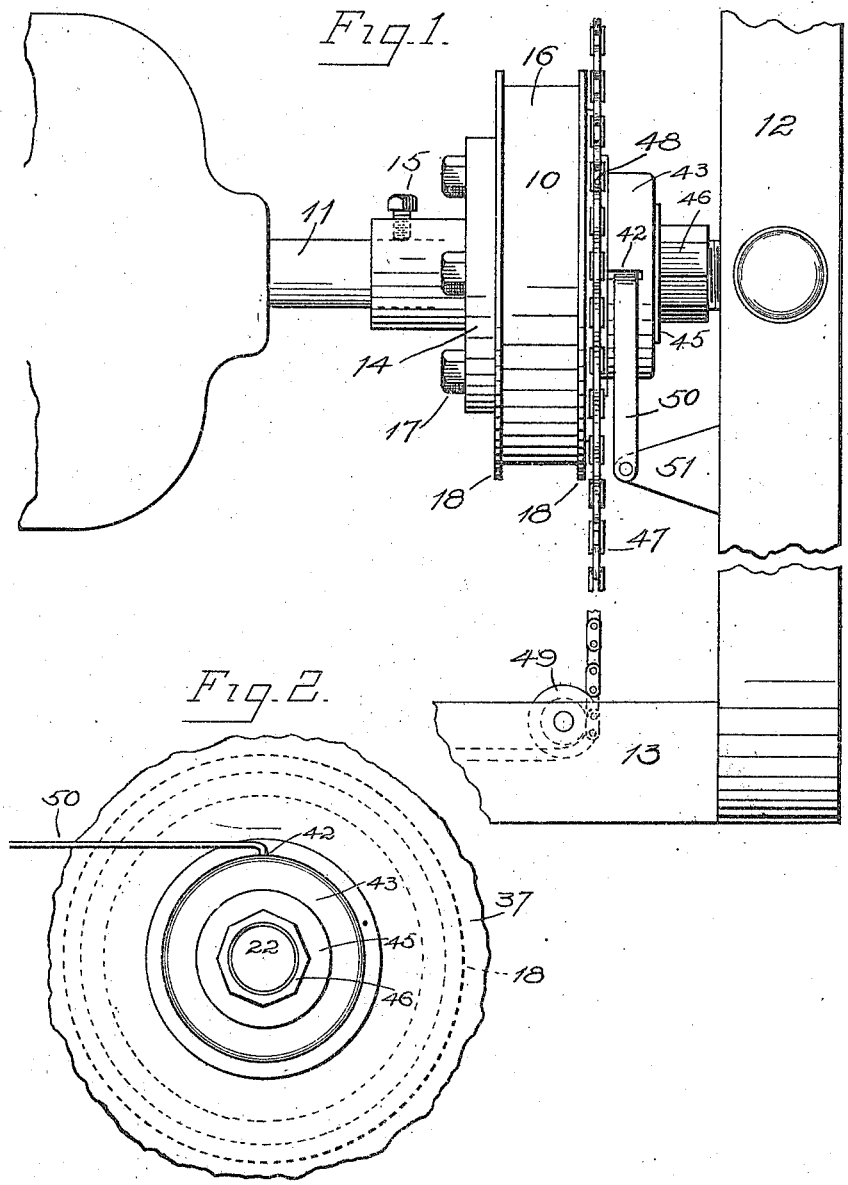

P. ODEIN.
EXPLOSIVE ENGINE STARTER.
APPLICATION FILED NOV. 5, 1917.

1,263,596.

Patented Apr. 23, 1918.
3 SHEETS—SHEET 3.

Inventor
Peter Odein
By
Henry E. Rockwell Attorney

UNITED STATES PATENT OFFICE.

PETER ODEIN, OF NEW HAVEN, CONNECTICUT.

EXPLOSIVE-ENGINE STARTER.

1,263,596.

Specification of Letters Patent. Patented Apr. 23, 1918.

Application filed November 5, 1917. Serial No. 200,371.

*To all whom it may concern:*

Be it known that I, PETER ODEIN, a citizen of the United States, residing in the city and county of New Haven and State of Connecticut, have invented certain new and useful Improvements in Explosive-Engine Starters, of which the following is a full, clear, and exact description.

This invention relates to an engine starter, and more particularly to a manually operable starter for gas engines, which can be operated by the person driving the car while seated at the steering wheel.

The principal object of the invention is to provide an improved form of apparatus of this class which is simple and durable in construction and effective and efficient in operation. For the attainment of these ends and the accomplishment of other new and useful improvements as will appear, the invention consists in the features of novelty in the construction, combination and arrangement of the several parts generally shown in the drawings and described in the specification, but more particularly pointed out in the appended claims.

In the accompanying drawings:

Figure 1 is a plan view of the engine starter, shown in its operating position upon the crank shaft of the automobile engine;

Fig. 2 is an end view of the starter, looking at the same from in front of the automobile upon which it is mounted;

Fig. 3 is a side view of the several parts of the clutch, shown spaced apart but in the order in which they are assembled;

Figure 10:
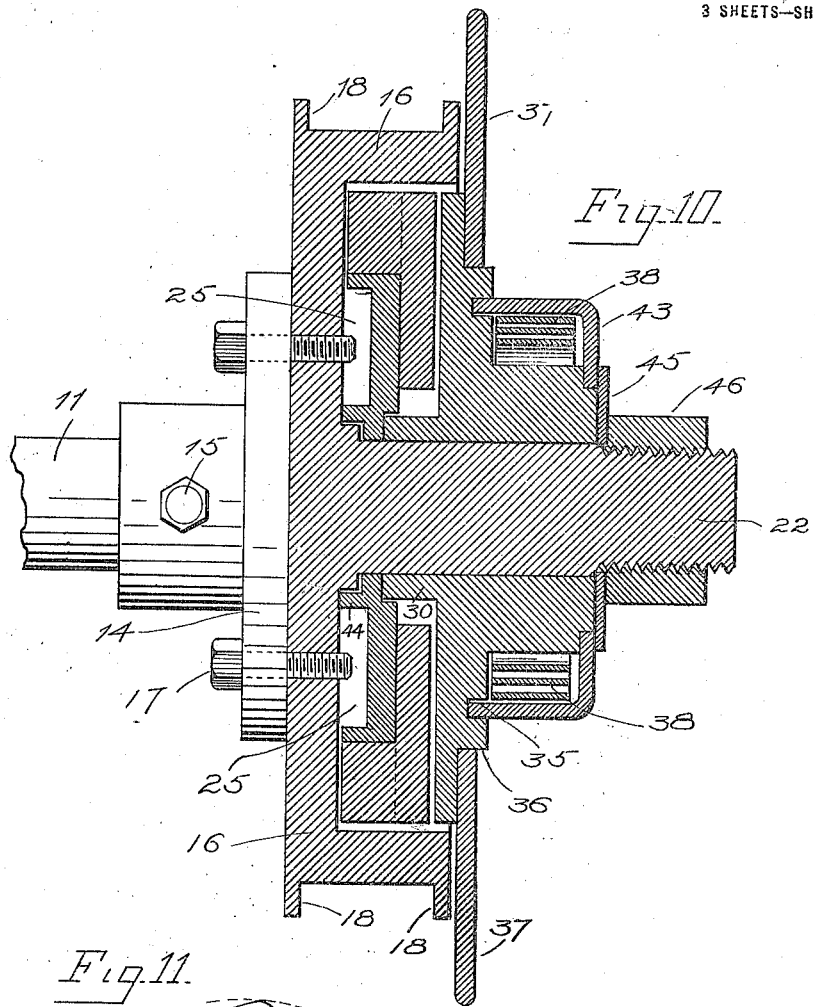
Figure 11:
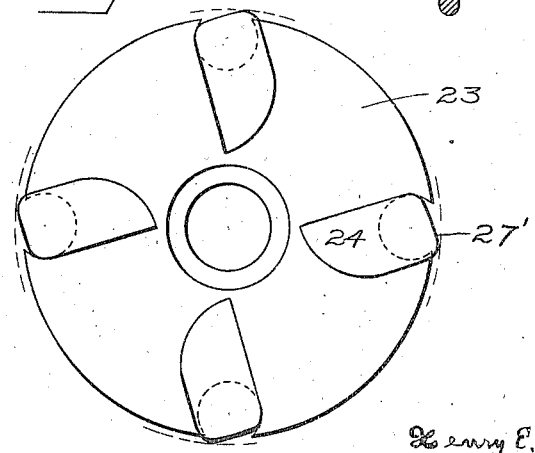

Figs. 4 to 8 inclusive are detail views of different parts of the clutch;

Fig. 9 is a perspective view of an element of the clutch;

Fig. 10 is a longitudinal section through the clutch, showing the parts assembled; and Fig. 11 is a side view of the pawl-carrying disk, showing the pawls mounted upon the same in their gripping position. The surface being gripped by the pawls is partially indicated in dotted lines.

Referring now more particularly to the drawings, the numeral 10 indicates generally the friction clutch which is mounted upon the crank shaft 11 of an automobile engine. The friction clutch is shown positioned immediately behind the radiator 12 of the automobile, a portion of the frame upon which the radiator is mounted being indicated as 13.

The friction clutch may be secured upon the engine shaft 11 by any convenient means such as a face plate 14, which may be rigidly secured to the shaft 11 by means of a set screw 15. The cylindrical outer casing 16 of the clutch member may be secured to the face plate 14 by means of bolts 17. The periphery of the casing 16 may be provided with spaced flanges 18 which may serve to retain a belt upon the periphery of the casing 16, if it should be desired to use this casing as a driving pulley for the fan, in addition to its primary function which is to form the outer portion of the friction clutch. The interior of the casing is cup-shaped, whereby a smooth, cylindrical interior wall 19 is formed. This wall provides a smooth friction surface with which the pawls hereinafter described coöperate. Concentrically mounted within the casing 16 is formed a round shaft 20, having near its outer end a shoulder 21, (the object of which will be hereinafter described) and threads 22 upon the end of the shaft.

Rotatably mounted upon the shaft 20 and within the casing 16 is a disk 23 which serves to carry the pawls 24. One face of the disk 23 is provided with an annular groove 25, which groove forms a clearance space for the bolts 17, should their ends project beyond the inner wall of the casing 16. In the periphery of the disk 23 is formed a plurality of circular openings 26. These openings form bearings in which the rounded portions 27 of the pawls 24 are pivotally mounted. The disk 23 is further provided with a central opening 28 which serves to receive the shaft 20.

Rotatably mounted upon the shaft 20 and adjacent to the pawl-carrying disk 23, just described, is a second disk, designated generally by the numeral 29. This disk has disposed centrally thereof a collar or sleeve 30, by means of which the disk 29 is rotatably mounted upon the shaft 20. One of the faces of the disk 29 is provided with a plurality of grooves 31, which grooves are provided to receive an extension 32 formed upon the lugs 24. Each of these grooves, as is shown in Fig. 6, has a straight wall or edge 33, which is positioned substantially tangentially to the shaft-receiving opening formed in the disk, whereas the opposite wall or edge 33' is curved and flares outward toward the periphery of the disk. The particular formation of these grooves is important, as will be hereinafter pointed out. The opposite face of the disk 29 is provided with a cylindrical boss 34 and an annular groove 35. Outside of the groove 35 is formed a circular seat 36, upon which seat is mounted the sprocket wheel 37 or similar means by which the disk 29 may be manually rotated. The sprocket wheel 37 is rigidly secured to the disk 29 by any desired means. Mounted upon the boss 34 is a coiled spring 38, the inner end of this spring having a hooked portion 39 which engages in the slot 40 formed in the periphery of the boss, and the outer end of the spring is provided with a hook 41 which engages in the slot 42 formed in the spring housing 43. The housing 43 is constructed to entirely inclose the coil spring 38 and the boss 34, and the inner edge of the housing is seated in the groove 35.

When the spring 38 is placed under tension it will tend to rotate the housing 43 to which its outer end is secured. In order to prevent the housing from rotating, a strap 50 is provided. This strap has a hook formed at one end which engages the slot 42, and the other end is provided preferably with an opening by which it may be bolted to a bracket 51, or any other convenient support positioned within the engine hood.

When the elements of the clutch so far described are assembled and the disks 23 and 29 are rotatably mounted on the shaft 20, the disk 23 is held against longitudinal movement upon the shaft 20 in one direction by an integral collar 44, and against movement in the other direction by the projecting end of the collar 30 formed upon the disk 29. By the arrangement just described, it will be seen that one face of the disk 23 is held out of frictional engagement with the inner wall of the casing 16 and the other face of the disk 23 is held out of frictional engagement with the inner face of the disk 29, which permits the disks to rotate freely upon the shaft 20 inside the case 16. These two disks and the housing 43 are prevented from moving longitudinally of the shaft 20 by a washer 45 which abuts against the shoulder 21 upon the shaft 20. The washer may be held in clamping engagement with the shoulder 21 by any convenient means such as a nut 46.

In order that the disk 29 may be rotated by the person driving the car while seated at the steering wheel, this disk is provided with the sprocket wheel 37, above mentioned, which sprocket wheel has a sprocket chain or similar operating means 47 passing underneath and partially around the wheel. One end of this flexible member is secured to the sprocket wheel by any convenient securing means, such as a pin 48. The sprocket chain extends from the underneath portion of the sprocket wheel to a pulley wheel 9 rotatably mounted on the frame 13. From this pulley wheel it passes back to a position where it may be conveniently pulled by the person driving the car without leaving his seat.

The operation of my device is as follows: From the above description it will be seen that the outer casing 16 of the clutch is rigidly secured to the shaft 11, so that whenever the shaft is rotated the casing 16 will also be rotated; and if the casing is rotated by the other elements of the friction clutch, this rotation will be imparted to the shaft 11 which will turn the engine over in order to start the same. When it is desired to start the engine, a person driving the car exerts a pull upon the chain 47. This chain, through the sprocket wheel, rotates the disk 29, which disk causes the pawls 24 to swing slightly upon their bearings, so that they assume the position indicated in Fig. 11, in which position they grip the friction surface 19 of the casing 16, and thereby rotate this casing. As soon as the chain 47 is released by the person driving the car, the coil spring 38 will cause the disk 29 to return to its normal position by rotating the same, whereupon the sprocket chain will be wound upon the sprocket wheel, the parts thus returning to their normal position ready to serve again for turning the engine over. It will be seen that as the spring 38 tends to restore the parts to their normal position, the hook 41 upon the spring will tend to rotate the housing 43. This rotation is prevented by the strap 50, as above pointed out.

The construction of the extension 32 formed upon the pawls 24 and the groove 31 is such that when the disk 29 is rotated in one direction, the face 32' of the extension will rest against the wall 33, and the end of the extension 32 adjacent the shaft 20 will be held in this position by the portion 33" of the wall 33'; this arrangement being such that the pawl 24 will be held so that the friction surface 27' of the pawl 24 will be held out of engagement with the friction surface 19 of the casing 16, and the casing 16 will be permitted to rotate freely without rotating the disk 29. Whereas, when the disk is rotated by the chain, the opposite wall 33' is brought into contact with the extension 32, and the pawls assume the position shown in Fig. 11, so that the friction surface 27' is brought into frictional engagement with the surface 19 of the casing 16, and this casing, with the shaft 11 to which it is rigidly secured, will be rotated.

From the above description, it will be seen that I have provided a simple and durable friction clutch comprising but few parts, which parts are not likely to get out of order. The arrangement being such that as soon as the sprocket wheel 37 begins to rotate in the direction to start the engine, the pawls will immediately grip the friction surface 19 of the casing and turn the engine over.

It is obvious that those skilled in the art to which this pertains can make various changes in the construction, combination and arrangement of the several parts without departing from the spirit and scope of the invention.

What I claim is:

1. In a mechanical starter for explosive engines, a friction clutch comprising a cylindrical case having an internal clutch-engaging surface formed therein, a pawl-carrying disk rotatably mounted in said case, a plurality of pawls pivotally mounted upon said disk said pawls being provided with extensions positioned to project inwardly from said pivotal mounting toward the axis of said disk, and means rotatably mounted within said case for operatively-engaging the extension formed upon said pawls.

2. In a mechanical starter for explosive engines, a friction clutch comprising a cylindrical case having an internal clutch-engaging surface formed therein, a pawl-carrying member mounted in said case, a plurality of pawls pivotally mounted upon said member adjacent said clutch engaging surface, and means rotatably mounted within said case for positively moving said pawls into and out of engagement with said clutch surface.

3. In a friction clutch, a rotatably mounted casing having an internal clutch-engaging surface formed therein, a pawl-carrying member rotatably mounted in said casing, a plurality of pawls pivotally mounted upon said member, and pawl-operating means rotatably mounted in said casing having portions thereupon for contacting with the opposite sides of said pawls to positively move the pawls into and out of clutching engagement with said clutch-engaging surface.

4. In a mechanical starter for explosive engines, a friction clutch comprising a hollow clutch member having a clutch-engaging surface formed therein, a plurality of pawls pivotally mounted within said clutch member adjacent said surface, supporting means for said pawls, and means having pawl-receiving grooves formed therein mounted within said clutch member for moving the pawls into frictional engagement with said clutch-engaging surface.

5. In a mechanical starter for explosive engines, a friction clutch comprising a hollow clutch member having a clutch-engaging surface formed therein, a shaft rigidly mounted centrally of said clutch member, a pawl-carrying disk rotatably mounted upon said shaft within the clutch member, pawls pivotally mounted upon said disk adjacent the periphery thereof, and a pawl-operating disk mounted upon said shaft adjacent said first mentioned disk.

6. In a mechanical starter for explosive engines, a friction clutch comprising a cup-shaped member, a plurality of pawls pivotally mounted within said member, supporting means for said pawls, and a disk for operating said pawls rotatably mounted within said member, said disk having pawl-receiving slots formed in one face thereof, whereby said disk operates to move the pawls into frictional engagement with the cup-shaped member.

7. In a mechanical starter for explosive engines, a friction clutch comprising a hollow clutch member having a clutch-engaging surface formed therein, a plurality of pawls pivotally mounted within said clutch member adjacent said surface, supporting means for said pawls, and means having pawl-receiving grooves formed therein mounted within said clutch member for moving the pawls into frictional engagement with said clutch-engaging surface, whereby rotation of said disk in one direction acts through the pawls to rotate the hollow clutch member.

8. In a mechanical starter for explosive engines, a friction clutch comprising a hollow clutch member having a cylindrical clutch-engaging wall formed therein, a shaft formed rigid with and mounted centrally of said clutch member, a pawl-carrying disk rotatably mounted upon said shaft, a plurality of pawls pivotally mounted upon said disk adjacent said wall, a disk for operating said pawls rotatably mounted on said shaft, said last mentioned disk having pawl-receiving slots formed therein, whereby rotation of said pawl-operating disk in one direction moves the pawls into frictional engagement with the clutch-engaging wall and rotates the clutch member through said pawls.

9. The combination with an explosive engine shaft, of a starter member connected to the engine shaft, the starter member having a cup-shaped casing with a cylindrical clutch-engaging wall formed therein and a shaft rigidly secured thereto and extending centrally of the clutch-engaging wall, a plurality of pawls pivotally mounted within the casing adjacent the cylindrical wall, supporting means for said pawls, and operating means for said pawls, both of said means being rotatably supported upon and retained in place by said rigid shaft.

10. In a mechanical starter for explosive engines, a friction clutch comprising a cylindrical case having an internal clutch-engaging surface formed therein, a pawl-carrying disk rotatably mounted in said case, a plurality of pawls pivotally mounted upon said disk adjacent said clutch-engaging surface, said pawls having extensions formed thereon, and a pawl-operating disk rotatably mounted in said casing, said operating disk having grooves for receiving said extensions formed in one face thereof, said grooves operating to hold said extensions either in a radial position or inclined to this position.

11. In a mechanical starter for explosive engines, a friction clutch comprising a cylindrical case having an internal clutch-engaging surface formed therein, a pawl-carrying disk rotatably mounted in said case, a plurality of pawls pivotally mounted upon said disk adjacent said clutch-engaging surface, said pawls having extensions formed thereon, a pawl-operating disk rotatably mounted in said casing, said operating disk having grooves formed therein to receive said extensions and positioned to swing said pawls into gripping engagement with the clutch-engaging surface when moved in one direction and to release said surface when moved in the opposite direction.

In witness whereof, I have hereunto set my hand on the 3rd day of November, 1917.

PETER ODEIN.